(12) United States Patent
Wylie et al.

(10) Patent No.: US 7,908,165 B2
(45) Date of Patent: Mar. 15, 2011

(54) METHOD AND APPARATUS FOR GENERATING PERFORMANCE CURVES

(75) Inventors: John Wylie, Toronto (CA); Andrey Malygin, Toronto (CA); Adrian Borys, Toronto (CA)

(73) Assignee: Knee-Bone, Inc., Toronto, Ontario (CA)

( * ) Notice: Subject to any disclaimer, the term of this patent is extended or adjusted under 35 U.S.C. 154(b) by 1306 days.

(21) Appl. No.: 11/406,292

(22) Filed: Apr. 19, 2006

(65) Prior Publication Data
US 2007/0247464 A1 Oct. 25, 2007

(51) Int. Cl.
*G06F 17/30* (2006.01)
*G07G 1/00* (2006.01)
(52) U.S. Cl. .......................................................... 705/10
(58) Field of Classification Search ........................ None
See application file for complete search history.

(56) References Cited

U.S. PATENT DOCUMENTS

| | | | |
|---|---|---|---|
| 6,236,977 B1* | 5/2001 | Verba et al. ...................... | 705/10 |
| 6,317,700 B1* | 11/2001 | Bagne ............................ | 702/181 |
| 6,895,411 B2 | 5/2005 | Keller | |
| 7,392,157 B1 | 6/2008 | Delurgio et al. | |
| 7,702,615 B1 | 4/2010 | Delurgio et al. | |
| 7,752,200 B2 | 7/2010 | Scholl et al. | |
| 2005/0085973 A1* | 4/2005 | Furem et al. ..................... | 701/50 |
| 2005/0097207 A1* | 5/2005 | Gluhovsky et al. ............ | 709/224 |
| 2006/0031182 A1* | 2/2006 | Ryan et al. ..................... | 706/50 |

FOREIGN PATENT DOCUMENTS

| WO | WO01/59674 | 8/2001 |
|---|---|---|
| WO | WO/2006/028803 | 3/2006 |

OTHER PUBLICATIONS

Robert Goodell Brown, Smoothing, Forecasting and Prediction of Discrete Time Series, 2004, Dover Phoenix Editions, pp. 92, 245-246 and 281.*
Harvey J. Motulsky and Lennart A. Ransnas, Fitting Curves to data using nonlinear regression: a practical and nonmathematical review, Nov. 1987, Departemnt of Pharmacology, University of California, http://www.fasebj.org/cgi/reprint/1/5/365.pdf.*
Robert Goodell Brown, Smoothing, Forecasting and Prediction of Discrete Time Series, 2004, Dover Phoenix Editions, pp. 92, 245-246 and 281.*

* cited by examiner

*Primary Examiner* — Romain Jeanty
*Assistant Examiner* — Brandi P Parker
(74) *Attorney, Agent, or Firm* — Perry+Currier Inc.

(57) ABSTRACT

A system and a method are set forth for generating performance curves for enabling user customized marketing communications proficiency and performance optimization, comprising collecting and storing historical vehicle data and response data relating for a marketing plan, normalizing the data to a standardized schema, performing non-linear polynomial regression analysis on the normalized data for generating a plurality of curves representing performance of the marketing plan, and displaying said plurality of curves to the user. Preferably, the plurality of curves are generated by a predictive analytics and forecasting engine using an optimized Chebyshev polynomial curve selected to a desired closeness of fit to the normalized data.

16 Claims, 13 Drawing Sheets

METHOD AND APPARATUS FOR GENERATING PERFORMANCE CURVES

FIELD OF THE INVENTION

The present invention relates in general to business intelligence systems, and more particularly to a method and apparatus for generating performance curves for planning and forecasting marketing initiatives and measuring the results thereof.

BACKGROUND OF THE INVENTION

Marketing communications (Marcom) is a business area in connection with which there is often little confidence in a clear nexus between spending and results. This lack of confidence arises because these communications create an environment in which sales are generated, but only rarely can be directly linked with actual marketing initiative. Although it is possible to generate data that shows a trending relationship between marcom spending and sales, with aggregated results, the impact of each individual marketing decision is rarely measurable, making it impossible to forecast critical aspects of marketing communication.

Accordingly, a need has been clearly identified in the industry for an analytic solution that can be used by marketing departments and corporate support to define and improve marketing communication costs and contribution to an organization, and more accurately forecast spending, as well as impact on sales channels and results.

Although most organizations collect and maintain vast amounts of data concerning market spending and sales, much of the formal data is administered by IT and therefore kept secure, while an equally huge volume of information is maintained on desktop computers and in file drawers. Corporate policies rarely mandate the sharing of such data, and there is no known method for unifying and interpreting the data. When organizations do decide to analyze the correlation between marketing spend and sales, they almost always consider only the end results in terms of 'bottom line' accounting figures, rather than wading through the volume of data that describes the complicated marketing mix of middle stages and steps. However, it is in the realities of this marketing mix, with varying degrees of proficiency and knowledge of sales cycles that almost all analytic solutions fail.

Moreover, upon considering and analyzing marketing and sales data, it is often difficult to isolate the conditions that influence success from among the multiplicity of obvious factors such as budget, branding, timing of tactics and competitive activity, as well as more subtle influences such as weather and interest rates. Given this complexity, it is impossible to use the data to run useful scenarios or forecasts for virtually all but the most structured and sophisticated data driven organizations.

Most organizations invest heavily in customer information (CRM), on the reasonable assumption that improved knowledge of each individual consumer will improve service and retention. However, there is a tendency to overweight and overwork data from the CRM base for planning purposes. Hence, the selection of target customers and the implementation of one-to-one strategies have occupied the innovation space in marketing since the late '80's.

Direct Marketing (DM) has also developed in conjunction with CRM, and is characterized by the ability to directly link sales to elements of the marketing spend. Proponents of DM have claimed full credit for specific sales success, thereby derogating other forms of marketing. For some organizations, the shift to DM strategies has been based solely on the ability to represent some form of return on investment (R.O.I). At the same time, the emergence of DM has begun to blur the lines between sales and marketing, resulting in new rules concerning 'leads' and conversion, and new challenges for the marketing industry.

Although CRM can provide targeting information, it remains silent on assessing the various tools of marketing communications (marcom) performance. The current state of the marketing and sales environment tends towards a silo-like structure. Within each silo, there is a limited view of performance. Each relies on its own data to deliver, plan, manage expectations, and develop an R.O.I. 'story'. However, these R.O.I. stories can rarely be compared or aggregated.

Until recently, software supported marketing analytic platforms were rare and typically only implemented as custom environment analysts, which are expensive, mostly statistical, and unable to do scenario planning at a useful speed. Consequently, such systems have proven to be inadequate for traditional businesses with multiple brands and lines of business and sales channels.

Of those businesses currently employing marketing analytics, each either uses customer-centric data as the base for trend analysis, or an analytic process to combine CRM and econometric data for trend analysis, or perform media metrics to manage opportunity strictly in the media mix. Simple media metrics tend to exhaust their R.O.I benefits in a short window, and both traditional CRM based and media metrics models cannot integrate widely diverse marketing communication investments. More particularly, although CRM is currently used to carefully consider markets, targets, offers and vehicles and link these scenarios to results, the CRM solutions that have proven to work are virtually unrepeatable because the circumstances of the interaction and the conditions of performance are not known or repeatable.

SUMMARY OF THE INVENTION

According to an aspect of the invention, a method and apparatus are set forth for enabling customized marketing communications proficiency and performance optimization without the high cost, limitations, uncertainty and sustainability problems of competitive marketing—R.O.I. solutions. Although the identical CRM is used for extracting granular spending details, leads and sales data, as in the prior art, the method and apparatus of the present invention uses non-linear polynomial regression analysis to transform observations of marketing investments and sales results into a highly granular self-learning environment that provides accurate forecasting, levers for optimization, and an ongoing measure of marketing proficiency. According to the preferred embodiment, a forecasting engine is provided that uses Chebyshev polynomial regression analysis, which is an improvement over prior art statistical analysis in that it effectively creates a way to measure a client's unique marketing proficiencies and thereby forecast unique performance opportunities. The forecasting engine employs the client's own data to learn the client's own range of performance, and constantly refines and improves the results. The preferred embodiment employs a proprietary mathematical algorithm that is self learning and that considers information particular to an activity that defines the period between the marketing communication investment and the sale.

Additional aspects and advantages will be apparent to a person of ordinary skill in the art, residing in the details of construction and operation as more fully hereinafter described and claimed, reference being had to the accompanying drawings.

BRIEF DESCRIPTION OF THE DRAWINGS

A detailed description of the preferred embodiment is set forth in detail below, with reference to the following drawings, in which:

FIG. 9, comprising

DETAILED DESCRIPTION OF THE INVENTION

Figure 1:
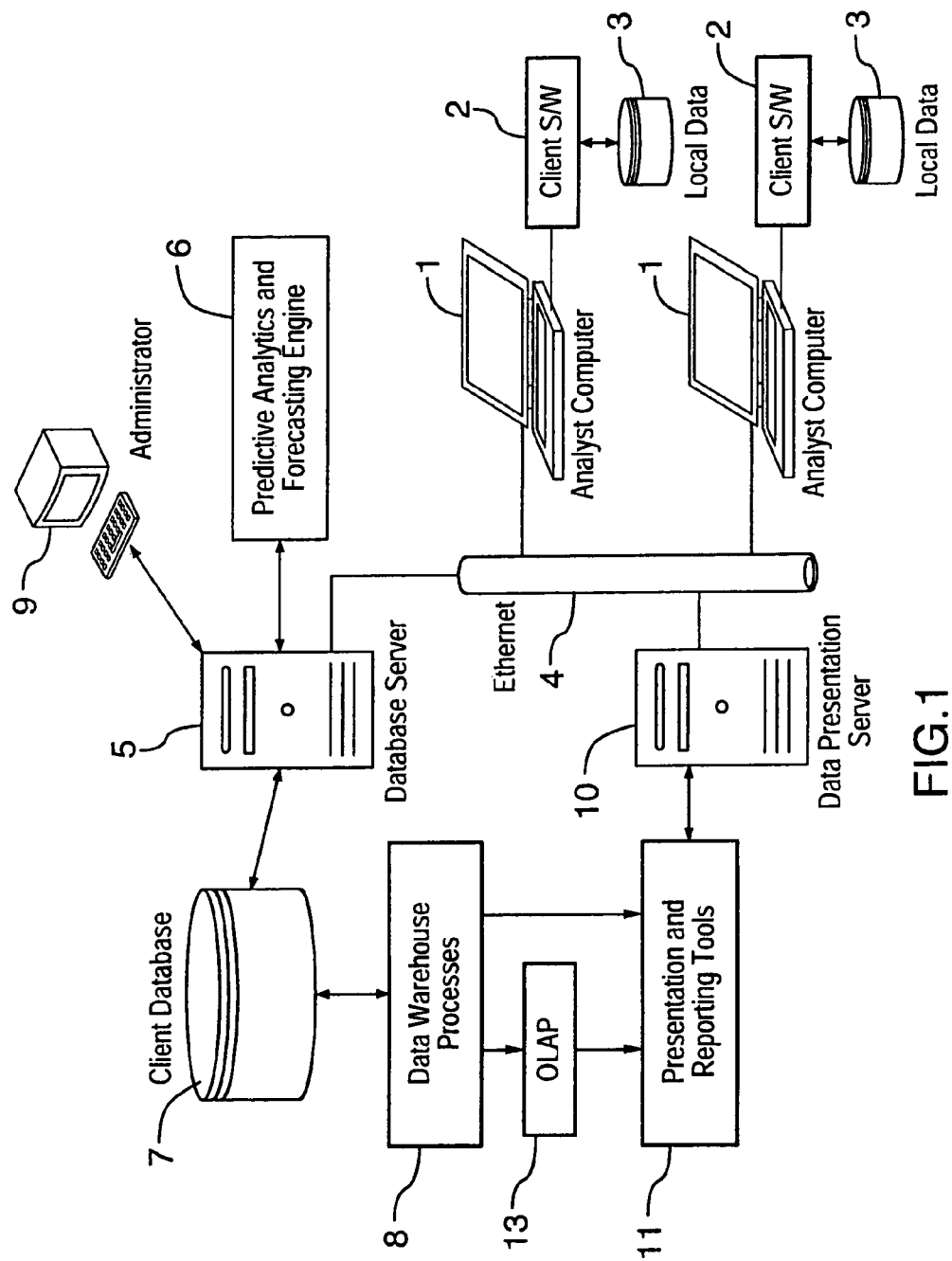
FIG. 1 is a block diagram of a computer architecture for implementing the method according to a preferred embodiment of the invention.

With reference to FIG. 1, a plurality of analyst client computers 1 is provided for executing client software 2 that operates on in-memory client datasets to create and manage marketing plans (e.g. using GUI), model and perform forecasts, create and forecast scenario plans, manage vehicles (i.e. delivery channels for carrying Ads, such as print, broadcast television, radio, etc.), advertisements, sources and modeling parameters, and provide integrated reports, as described in greater detail below. The client computers 1 preferably run Windows 2000 (or better) and are provided with at least 512 MB of RAM (1 GB recommended). Local data storage 3 is provided for saving XML scenarios (i.e. marketing plans that are in-process but not been committed to the production database), XML forecasts, data presentation export files (e.g. CSV, XML, etc.), media lead reports, etc.

According to a successful prototype of the invention, the client computers 1 are connected via Ethernet 4 to a database server 5 (e.g. using DBExpress connections) that, in turn, accesses a client database 7 for storing the client's campaign media plans, data warehouse processes 8, forecasting results and administrative logs. According to one embodiment of the invention, database 7 is an IBM DB2 V7 FP9 (or greater), executed on a dual processor server 5 with at least 1 GB of RAM and two drive mapped file shares (also accessed by the client software 2), using the local server or domain security model for access. However, other platforms may be used. Data warehousing processes 8 are included (preferably using IBM Business Intelligence Data Warehousing Services) for custom data imports, scheduled administrative functions and client star schema data mart processes for centralizing Fact data tables with many related lookup or dimension tables, as is known in the art. Stand-alone data importers and converters may be included in the client software 2 (e.g. written using Microsoft Access with VBA for applications) for semi-automatic receipt and data conversion of raw client data into the database 7. This requires Microsoft Excel and Access 2002 (or better) to be installed on client computers 1. More powerful data import processes may require SQL Server DTS, SAS or similar products. A person of skill in the art will appreciate that there are numerous methodologies and mechanisms for importing data into the system and that the use of Access and/or Excel is merely illustrative and not limiting or restrictive to the scope of the invention.

Although not illustrated, a date generator may also be provided to automate generation of dates conforming to a client's fiscal year thereby allowing simplified lookups based on fiscal year, quarterly and weekly curve descriptors.

Database server 5 executes, inter alia, software for implementing a predictive analytics and forecasting engine 6 (although it is also possible to run the engine 6 on a separate dedicated server). The engine 6 is preferably implemented in a Windows Server 2000 or 2003 environment, and must be connected to database 7 for importing raw data, summarizing and processing the raw data in accordance with predefined marketing plans, and calculating modeling parameters and preparing performance curves for all vehicles of the marketing plan. In the absence of historical data, engine 6 uses industry specific default data, as discussed in greater detail below. The engine 6 is also capable of using curves from one client (or analyst), devolve them into raw data and re-calculate base curves appropriate for use with a new client and specified fiscal year. The server 5 also provides access to an administrator 9 for performing conventional administrative functions.

Although the generic implementation of FIG. 1 may be used in many implementations, other configurations are possible. For example, in a single analyst environment, the database 7, administration engine 6 and client software 2, may be installed on a single server with desktop access.

A data presentation server 10 provides access for the analyst computers 1 (e.g. via Ethernet 4 or, remote thin access via such as Citrix) to reporting and presentation tools 11 that access the data warehouse processes 8 directly (using ODBC DSN) or via cubes 13 (e.g. Cognos OLAP cubes, utilizing DWH (Data Ware House) Star Schemas) for automating client reporting and queries.

Figure 2:
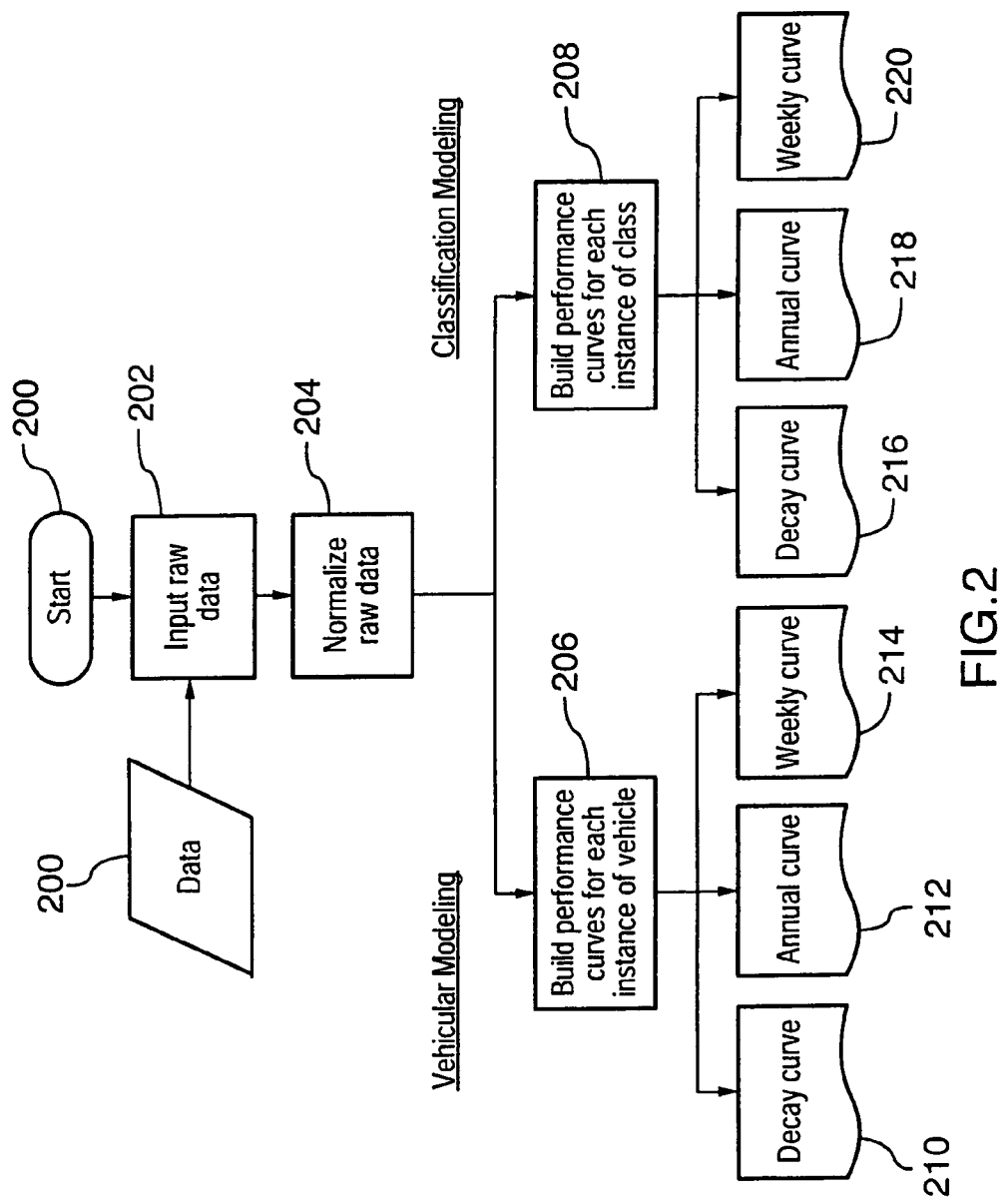
FIG. 2 is a flowchart showing steps in operating a method for generating performance curves according to the architecture of FIG. 1, for planning and forecasting marketing initiatives and measuring the results thereof.

In operation, with reference to FIG. 2, upon launching the predictive analytics and forecasting engine 6 (step 200), raw data 201 in the form of historical vehicle data (i.e. marketing plan) and response data (i.e. data collected against the vehicle), are retrieved from database 5 (step 202) and normalized (step 204) via data converters to a standardized schema in preparation for analysis (i.e. normalized to within a range of 0-1). The normalized data is divided into two categories: vehicles (i.e. individual client media), and classification (i.e. groups of like vehicles), and for each stream, three performance curves are generated (steps 206 and 208).

Specifically, for each instance of each vehicle a decay curve 210, annual curve 212 and weekly curve 214 are generated. Thus, for a marketing plan that utilizes 1000 vehicles, the system will generate 1000 sets of curves. Likewise, for each instance of a class of vehicles a decay curve 216, annual curve 218 and weekly curve 220 are generated. Thus, for a marketing plan that utilizes 10 classification groups, the system will generate 10 sets of curves.

Figure 3:
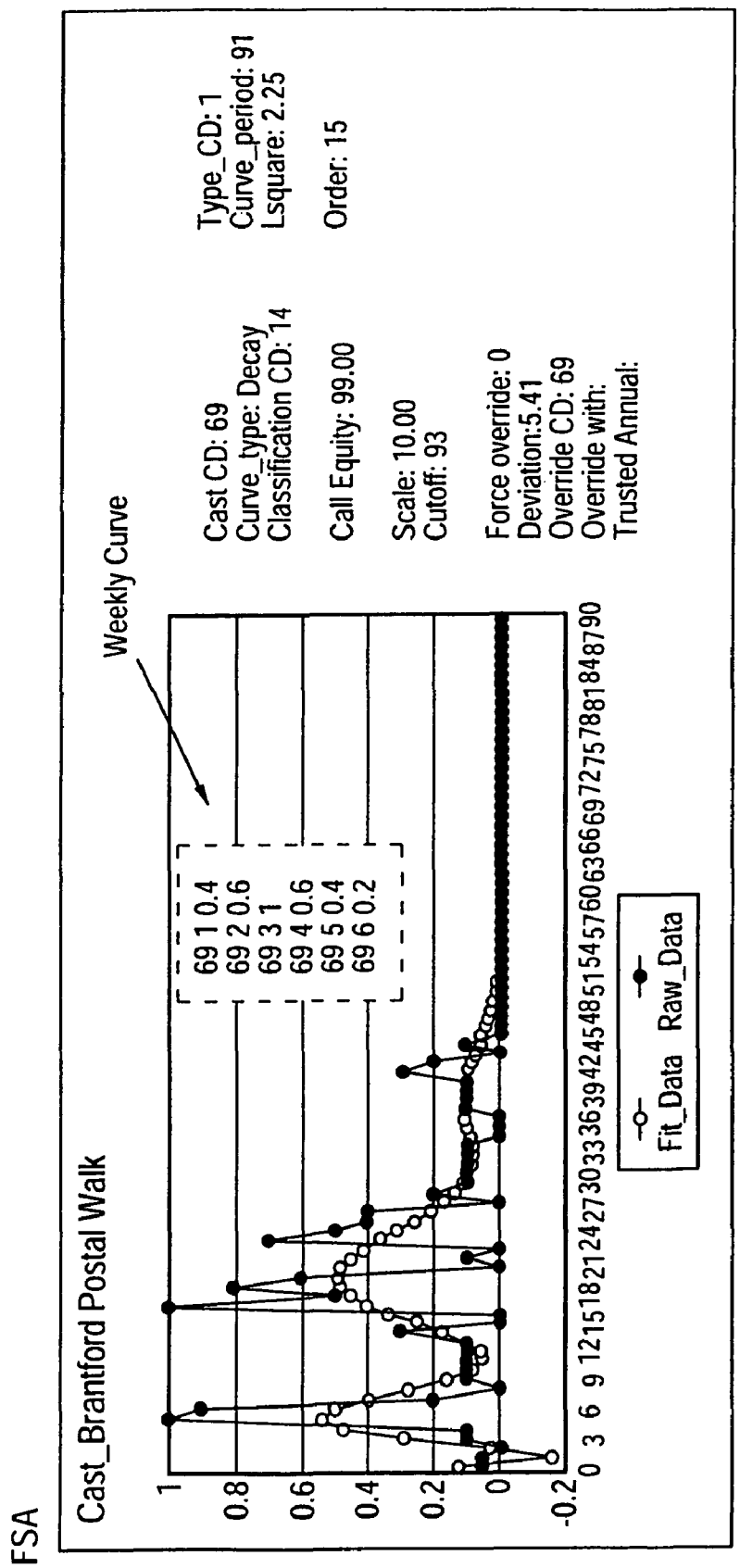
FIG. 3 depicts a decay curve generated according to an embodiment of the system and method of the present invention.

An exemplary decay curve 210 is shown in FIG. 3 (Curve Type=Decay or Type_CD=1), as displayed by the Predictive Analytics Engine 6, wherein the fit curve is superimposed over the raw data. The fit curve is generated by predictive analytics and forecasting engine 6 using an optimized Chebyshev polynomial curve to a desired closeness of fit (i.e. Order: 15) to the raw data, as discussed in greater detail below with reference to FIG. 9. The horizontal axis is expressed in terms of days while the vertical axis represents the normalized response to the specific vehicle instance. Each vehicle is identified by a Cast CD (i.e. "Forecast Model" that defines how a vehicle or group of vehicles will be forecast), which is a mapping ID number for the specific vehicle (e.g. postal flyers) and a classification (i.e. Classification CD: 14) indicating in which class the vehicle belongs. A person of skill in the art will recognize that CD is a standard industry suffix to a field name representing a link to another table for more detailed information.

The curve has a defined curve period (i.e. 'lifetime') of usually 91 days although client settings allow for the period to be dynamic. Renormalization data (Call Equity) is maintained representing the sum of the metric (often Calls to a call center, hence the term Call Equity) used for re-normalizing the curve.

Figure 4:
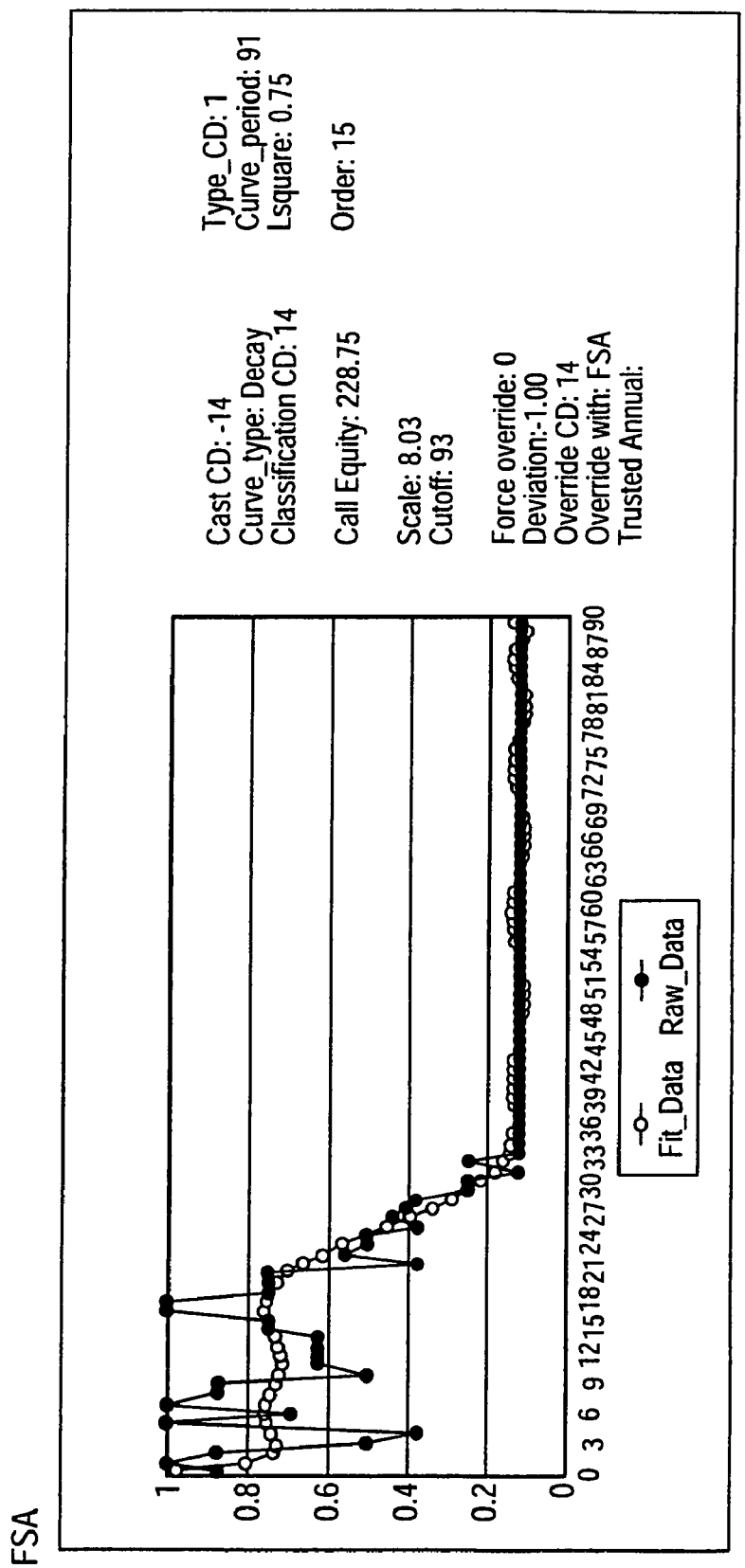
FIG. 4 depicts a default decay curve generated according to an embodiment of the system and method of the present invention.

According to one embodiment, the decay curve of FIG. 3 is compared to a class default for its curve family, such as shown in FIG. 4. This class default may override the decay curve in the event that certain criteria are met (e.g. the decay curve exceeds a predetermined deviation (Deviation=5.41). A default curve itself mat be overridden by a Master Default for the client (Override_CD=−999) under similar criteria. The master default curves describe the overall nature of a client's business model. Default curves based upon historical data for particular classifications of media vehicles are stored in database 7, as well as master default industry-specific curves. In the illustrated example, no override is recommended (identified by Override CD=69) in the Decay Curve or in the Default Curve (identified by Override_CD=14). Also, the analyst may force an override of the decay curve by any other curve (e.g. Force override=1).

In addition to the decay curve, a weekly curve is generated comprising a set of normalized ratios that determine how the vehicle behaves during each of the seven days of the week, as defined for a client. Since a decay curve is virtualized to be independent of an actual date, the weekly curve is superimposed on the decay curve, as shown in FIG. 3. In the example shown, "69" appearing in the first column indicates the Cast CD for the vehicle, the second column indicates day of the week (e.g. day 1, day 2, etc.) while the last column shows the normalized ratio of performance for the vehicle on the indicated day.

Figure 5:
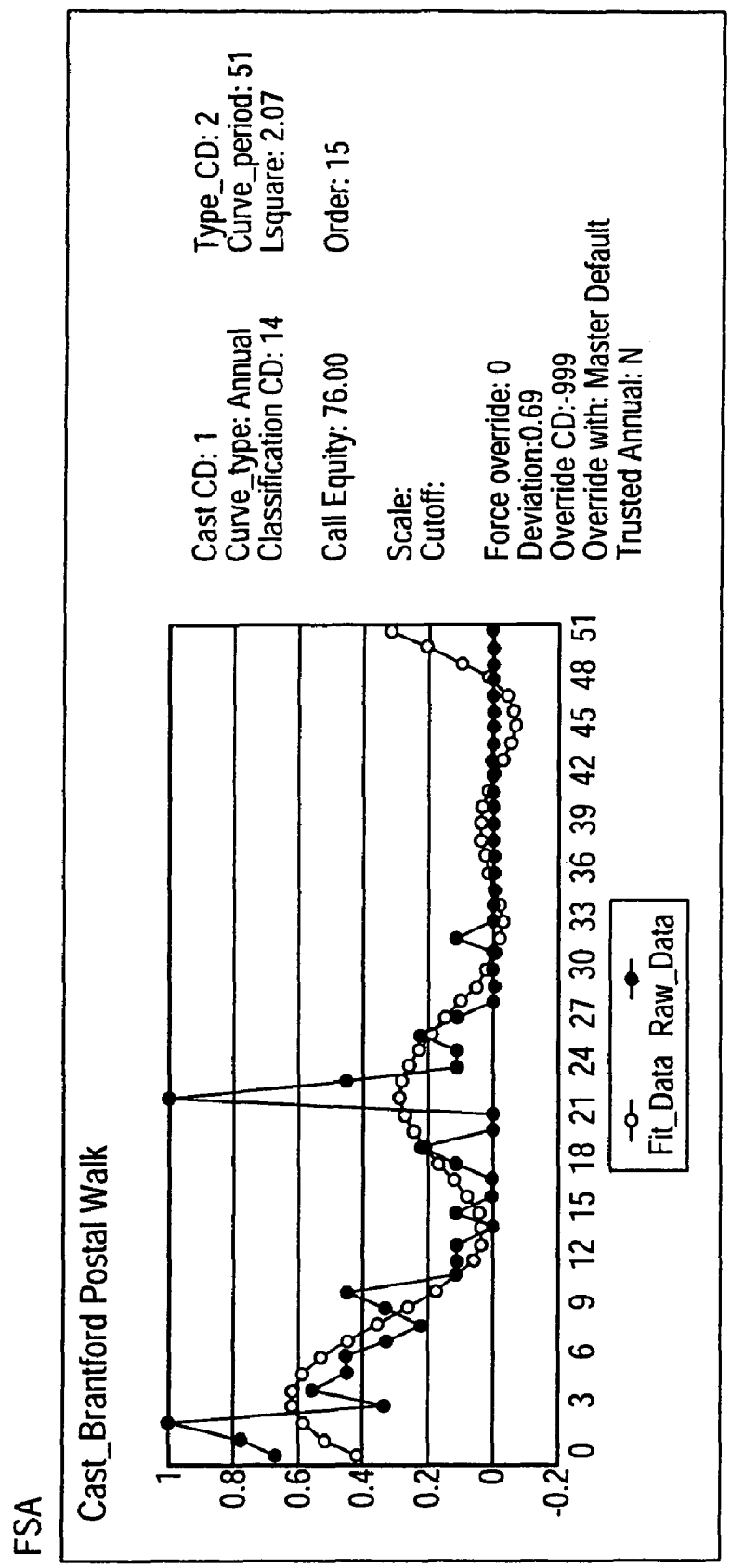
FIG. 5 depicts an annual curve generated according to an embodiment of the system and method of the present invention.

FIG. 5 depicts an annual curve for a different vehicle than was used to generate the decay and weekly curves of FIGS. 3 and 4. The annual curve is characterized by a period of 52 weeks or one fiscal year as defined for a client. The annual curve modulates the decay and weekly curves according to seasonal parameters to describe how the vehicle behaves when used at different times of the year. Thus, for an immature client, data may be missing such that the curve is overridden with a class default (or master default). As annual knowledge improves at the vehicle level, the annual curve will eventually show data at all times of the year and not be overridden.

Figure 6:
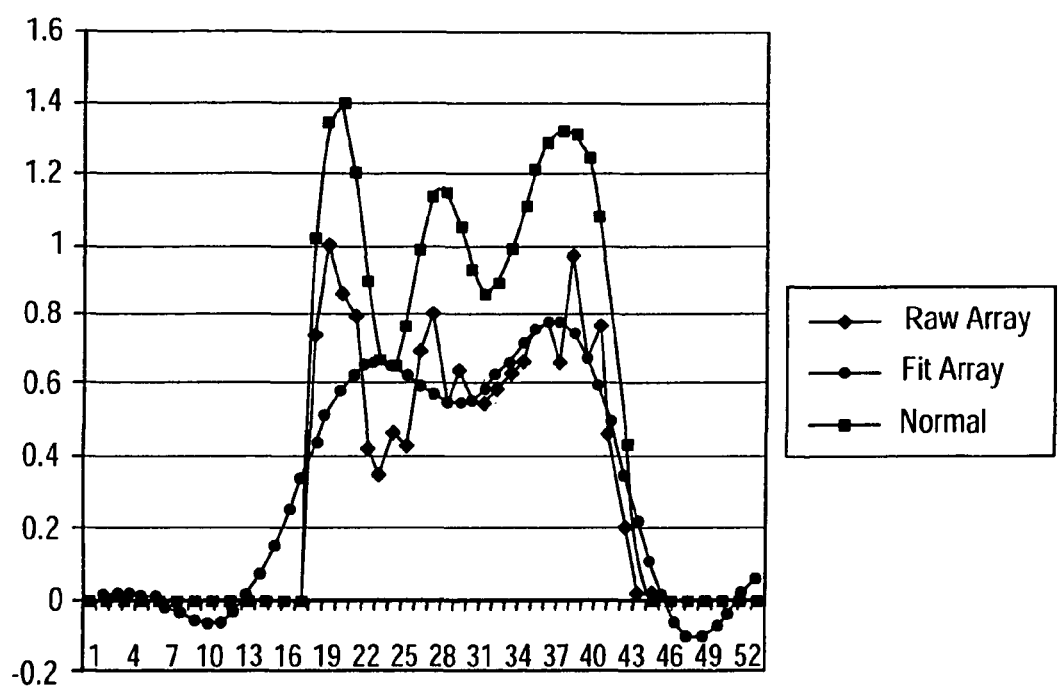
FIG. 6 depicts a composite trusted annual curve generated according to an embodiment of the system and method of the present invention.

Also, it is possible for an annual curve to be missing information because of the nature of the vehicle (e.g. tracking mitten sales in July), in which case the analyst can instruct the system to "trust" the curve in response to which a process is executed for blending the nature of the curve with the "missing" underlying data to construct a composite curve (FIG. 6) for use in forecasts. This would be indicated by the parameter Trusted Annual=Y. Specifically, the predictive analytics and forecasting engine 6 reads the Trusted=Y parameter and calculates the curve to order=35 (usually curves use order=15). The forecasting engine then constructs a re-normalized curve using the Call Equity and queries the actual data for weeks with zero response data. The re-normalized curve is flattened and curve fitting noise surrounding the discontinuity created is smoothed. Finally, the flattened re-normalized curve is then 'floated' about its average calculated by ignoring zero response periods.

For the purpose of explanation, decay, weekly and annual curves are depicted only for a vehicle. However, the same methodology is utilized to create decay, weekly and annual curves for each class of vehicle, as discussed above with reference to FIG. 2.

Figure 7:
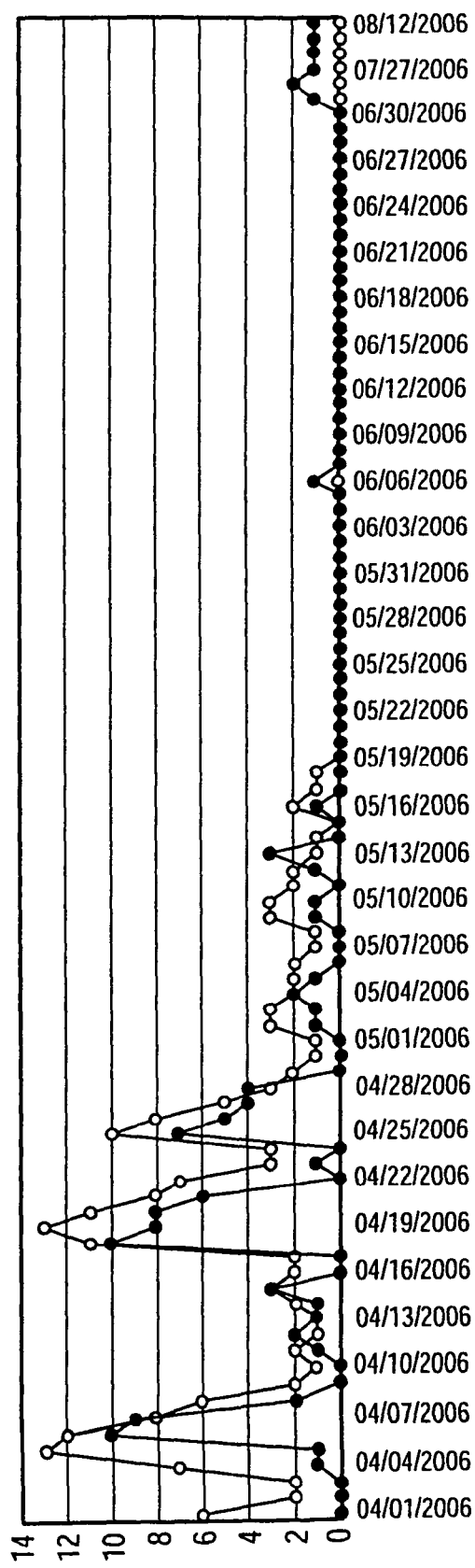
FIG. 7 depicts a forecasting curve generated from decay, weekly and annual curves for an actual instance of a vehicle according to an embodiment of the system and method of the present invention.

As shown in FIG. 7, for an actual instance of a vehicle, all three curves (decay, weekly and annual) are used to build a forecast of behavior (Cast Results) which can be tracked against actual behavior (Actual Results). Thus, the "Ran Date: Apr. 1, 2005" identifies the vehicle instance (Cast CD: 69) used to generate the forecast curve.

Figure 8:
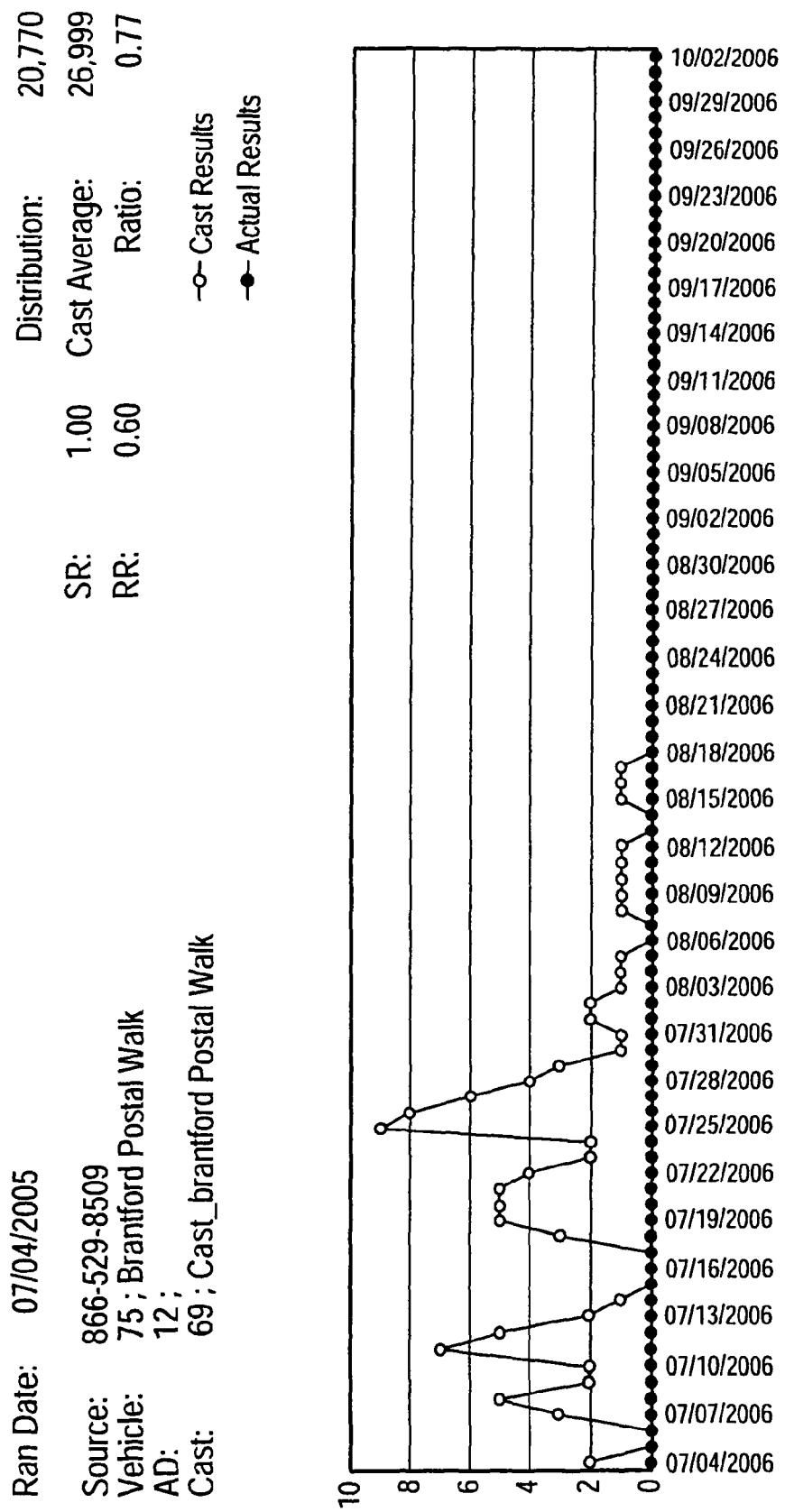
FIG. 8 depicts a forecasting curve generated from decay, weekly and annual curves for a future instance of a vehicle according to an embodiment of the system and method of the present invention.

According to an aspect of the invention, it is also possible to run a pure forecast in advance of actual behavior, as shown in FIG. 8. Thus, for the illustrated example, the forecast is based on the same curves as FIG. 7, but occurs at a different time of year, on different days and with a different distribution (e.g. number of deliveries of the postal walk flyer distribution), as determined by the analyst. The analyst also applies the desired spend ratio (SR: 1.00) and has decided to provide an overridden response rate (RR: 0.60).

Figure 9A:
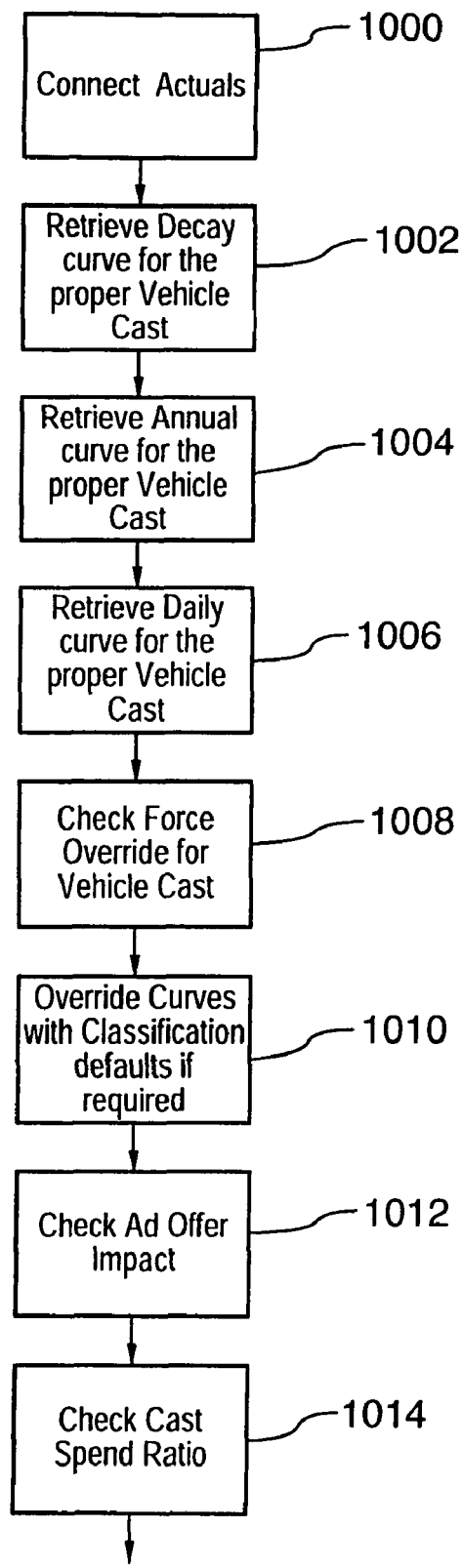
FIGS. 9A and 9B, is a flowchart showing steps in operating a method for generating forecast curves according to the architecture of FIG. 1.
Figure 9B:
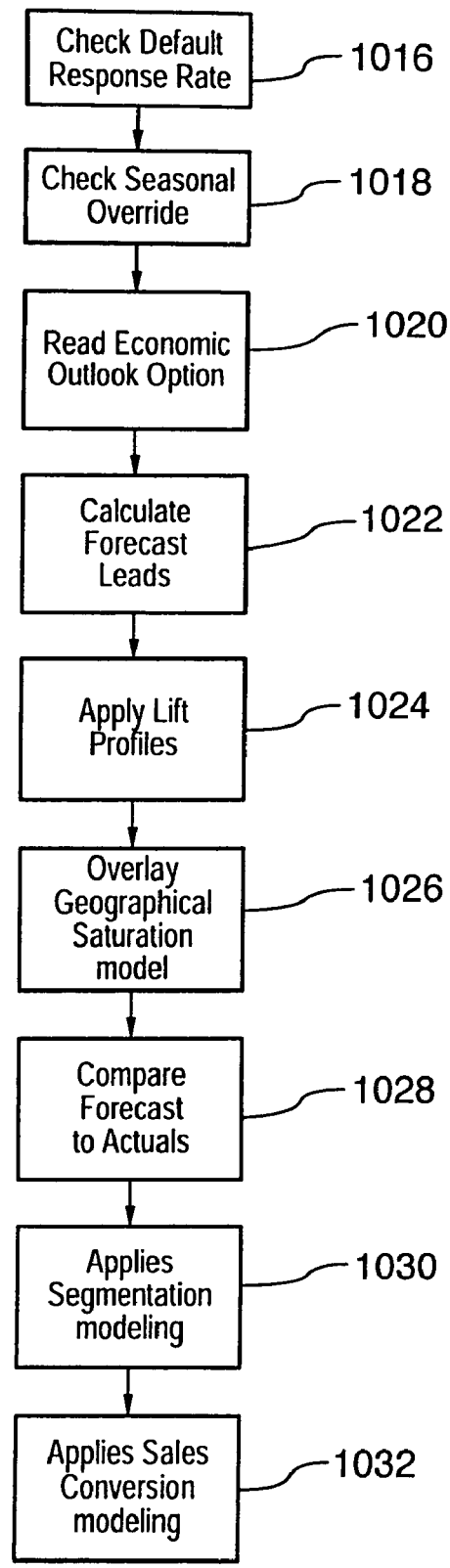

An exemplary method for generating forecasting curves (referred to in FIGS. 7 and 8) is illustrated in the flowchart of FIG. 9 wherein, for each instance of a vehicle being forecast, the following work flow is executed.

At step 1000, engine 6 queries the client database 7 for any Actual Leads collected for the Detail (where "Detail" means an instance of a vehicle being forecast).

Next, at step 1002 engine 6 reads decay curve coefficients and the Lead Equity (total expected Lead Volume) value and calculates the Daily Lead Volume going forward from Ran Date.

If, at step 1004, Annual Variation is enabled, engine 6 reads Annual curve coefficients, connects them to the fiscal year dates, and calculates a daily variation factor going forward from Ran Date.

If Daily Variation is enabled, engine 6 reads Daily curve coefficients, connects them to the fiscal year dates, and calculates a variation factor for each day of the week at step 1006.

At step 1008, engine 6 Checks the Vehicle Cast properties to see whether a Forced Override is in place. If so, the above three curves are replaced with the specified override and no further overrides are applied to decay or daily curves (an "Un-Trusted Annual curve may have a curve override applied).

Engine 6 override Curves with Classification defaults at step 1010 if no curves exist for the Vehicle Cast or if a curve recommends using the default curve. If required, engine 6 reads the Classification ID for the default model that should be used in place of the above three curves. In turn, a default curve may recommend that it be overridden by the Master Default curves.

If, at step 1012, Price Point is enabled, a variation factor is calculated from the Offer Impact rule set for the Ad.

At step 1014, engine 6 checks Cast Spend Ratio. As discussed above, the forecasting of Leads is based upon historical performance of Vehicles. Each Vehicle has a Distribution which defines its circulation. If the current Detail has a Distribution greater (or smaller) than the historical average, then a Spend Ratio calculation may come into effect. There are two settings for the calculation. Spend Ratio=manual: results in a variation factor being calculated from the Spend Ratio setting of the Vehicle Cast. Spend Ratio=auto: results in a variation factor being calculated by comparing the Distribution of the Detail to the Average Distribution upon which the analytic modeling of the Vehicle Cast is based.

If, at step 1016, a Default Response Rate exists for the Vehicle Cast and it is checked off as Override, engine 6 uses the Default Response Rate in place of the historical Lead Equity. If the curve required for this Cast is missing, then engine 6 requires the Default Response Rate value associated with the Vehicle Cast. If this is the case and there is no value entered for the Vehicle Cast's Default Response rate, an error is generated.

If Seasonal Variation is enabled at step 1018, engine 6 looks up the variation that should be applied for each day going forward from the Ran Date.

If Economic Outlook is enabled at step 1020, a variation factor is calculated from the setting of the associated Cast Options slider.

A final re-normalization parameter is calculated at step 1022 by devolving the weekly curve ratios against the populated call volume array. This occurs only after the call volume array has been mapped against a series of known dates. For the period of the decay curve (usually 91 days) going forward from the Ran Date, a Lead volume is calculated utilizing all enabled variables. This quantity is stored as a Base Lead Volume.

If, at step 1024, Lift profiles are enabled, the effect of cross-vehicle lift is applied, as discussed in greater detail below.

If Geographical Saturation is enabled, at step 1026, a modified Lead Volume is calculated using the Base Lead Volume values and the various Geographical ceilings. When saving forecast results, both the base and modified values are stored allowing for re-casts using new cast options, as discussed in greater detail below.

For each Vehicle Focus/Quarter/Week grouping, engine 6 calculates a percentage deviation of the Forecasted Leads from the Actual Leads collected, at step 1000. This only applied to Past weeks where such data may be available.

If segmentation is enabled for a client, at step 1030, the Segmented Results data set is populated.

Finally, if at step 1032, Sales Conversion rules are enabled for a client, the rules are applied and the Sales Conversion Results data set is populated.

As discussed above, forecast results can be saved to the production database 7 as an in-production forecast, or saved as an XML dataset 3 for reporting or offline analysis.

In order to generate each of the various curves discussed above, predictive analytics and forecasting engine 6 performs a curve fitting operation on the set of raw data stored in database 7 for finding a curve that best approximates the set of raw data. It is known in the art to use an nth order polynomial for Least Mean Squares (LMS) curve fitting, in which the coefficients of each order (and the number of orders chosen) are calculated. However, as discussed below, polynomials of this sort do not form a closed set and convergence to a solution, for a single complicated curve, may require many orders and considerable time to complete the calculations. The least squares method corresponds to minimizing the length of a vector Ax−b, where A is a matrix containing the values of a plurality of basis functions at the x-coordinates of the data points, b is a vector containing the y-values of the data points, and x is a vector containing the unknown coefficients of the basis function in a "best fit" combination.

The least squares problem involves solving the normal system of simultaneous equations: $A^T A x = A^T b$, where any set of functions can be used as basis functions, and wherein the unknown parameters correspond to the coefficients of the least squares fit.

The simplest of these is a constant function. The resulting 'fit' is simply the mean of the y-values of the data points.

To fit a straight line through a set of points, the basis functions are a constant function and the function $f(x)=x$. The result is a linear model of the form $y=ax+b$.

To fit a polynomial, the basis functions are the 'monomials' $1, x, x^2, x^3$, and so on, up to a certain degree. Polynomials are often used because they have such a simple form. However, instead of using monomials, the preferred embodiment uses Chebyshev polynomials as basis functions for polynomial fitting. Chebyshev polynomials are a special kind of polynomial in that they are mutually orthogonal, which means that calculations are more accurate as round-off error is reduced, and they also oscillate very evenly, which results in decreasing coefficients as the degree of the polynomial increases. With ordinary polynomial fits, the coefficients often show wild oscillations, further decreasing their accuracy. The optimized Chebyshev system of the preferred embodiment is capable of fitting hundreds of curves in a short period of time (i.e. in the order of seconds rather than minutes or hours as with conventional polynomial curve fitting), using a low order for each curve.

The Chebyshev polynomials (denoted $T_n(x)$) of the first kind (i.e. normalized such that $T_n(1)=1$), are a set of orthogonal polynomials defined as the solutions to the Chebyshev differential equation. They are used as an approximation to a least squares fit. The first few polynomials are illustrated in FIG. 10 for $x \in [-1, 1]$ and $n=1, 2, \ldots, 5$, as follows:

$$T_0(x) = 1$$
$$T_1(x) = x$$
$$T_2(x) = 2x^2 - 1$$
$$T_3(x) = 4x^3 - 3x$$
$$T_4(x) = 8x^4 - 8x^2 + 1$$
$$T_5(x) = 16x^5 - 20x^3 + 5x$$
$$T_6(x) = 32x^6 - 48x^4 + 18x^2 - 1.$$

Figure 10:
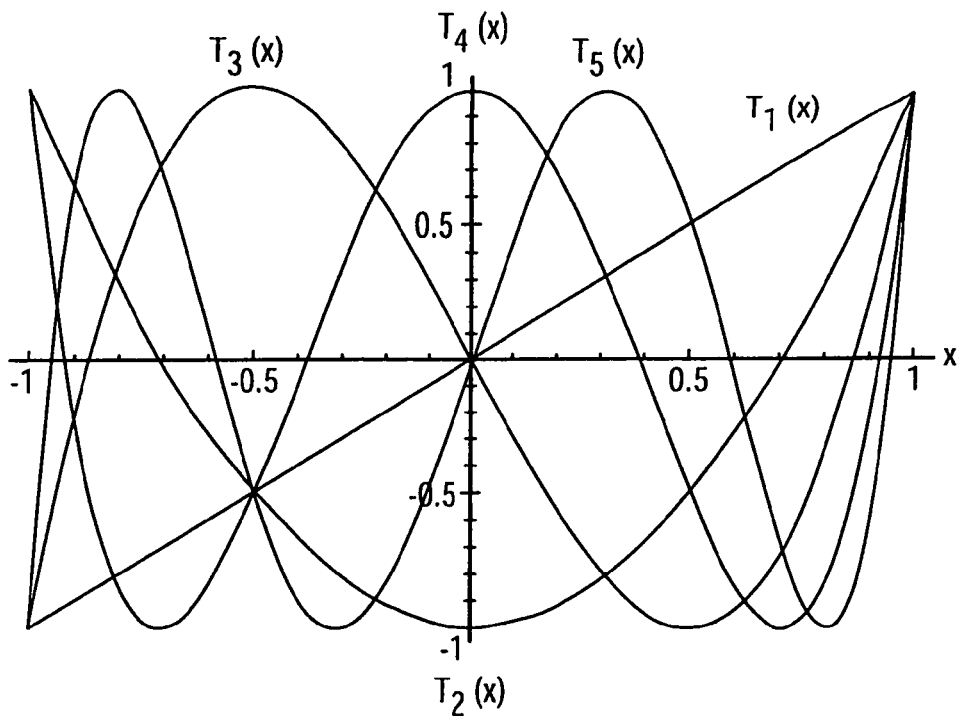
FIG. 10 shows a Chebyshev polynomial curve space used to generate the decay and annual curves according to an embodiment of the system and method of the present invention.

Thus, predictive analytics and forecasting engine 6 performs a curve fitting operation on the set of raw data stored in database 7 using the Chebyshev polynomial curve space of FIG. 10, to generate the performance curves discussed above.

Returning briefly to FIG. 9, Lift Profiles are applied at step 1024. The Lift Profiling capability allows an analyst to model lift and to learn on a client-specific basis. Some vehicles will cause the leads generated by other vehicles to be more or less than they would have been in their absence. These Vehicles are said to provide "Lift". It is possible for the effect to be negative, in which case the effect will be a suppression of leads from normal.

Figure 11:
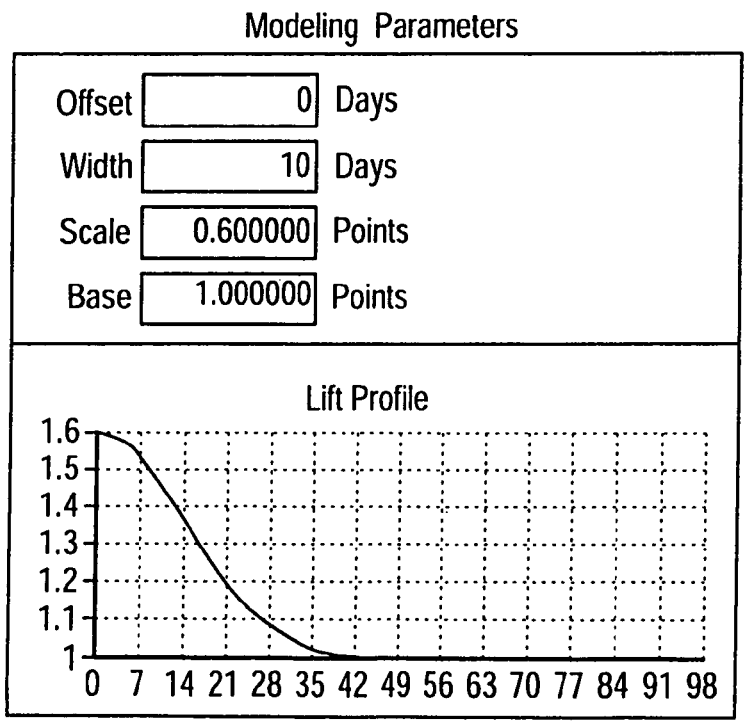
FIG. 11 shows a lift profile modeled for a Causative vehicle and FIG. 12 shows a superposition of lift profiles for forecasting the response of a vehicle affected by lift, according to a further aspect of the invention.

In order to model lift, engine 6 builds a profile for how a Cause Vehicle Cast creates lift or suppression on a Target or Effect Vehicle Cast. The profile is a curve which shows in time, from the Ran Date of the causative vehicle, the multiplicative effect on a target Vehicle, as shown in FIG. 11. As discussed in greater detail below, the end result of a lift profile is a multiplicative factor. If Lift=1.6 then a 60% increase in response is expected (or a response which is 1.6 times normal). If Lift=0.3 then the response will be 0.3 times normal or 70% less than the expected norm.

The Lift profile is a normal distribution curve governed by four parameters: Offset, Width, Scale, and Base. In FIG. 11, the cause vehicle has an immediate effect on the target vehicle (zero offset) and has a half maximum width (causal duration) of 10 days. It provides a maximum lift of 60% above normal or Base response for the target vehicle. Specifically, Lift=b+ s*exp $[-((t-o)/2w)^2]$, where b=Base, w=Width, o=Offset, s=Scale, and t=Time from Ran Date. According to a successful prototype of the invention, the parameters w, o and s are input by the analyst to test and then capture lift models. However, it is contemplated that future embodiments may, instead, measure lift. The scale "s" defines the variation of the lift about the base. The base is almost always b=1 so that well before and after s has any value, the lift factor is 1 (no change from normal). As an example, an analyst might use a base b=0.5 and a scale s=0.5 to model the attrition of response for vehicles as brand spend is removed from the market place. The lift profile can then be built to decay from 1 (normal) to 0.5 (50% or normal). Using the lift model (in this example it is used for suppression), the analyst can build detailed rules for how the removal of brand spend will show itself against campaign response.

Figure 12:
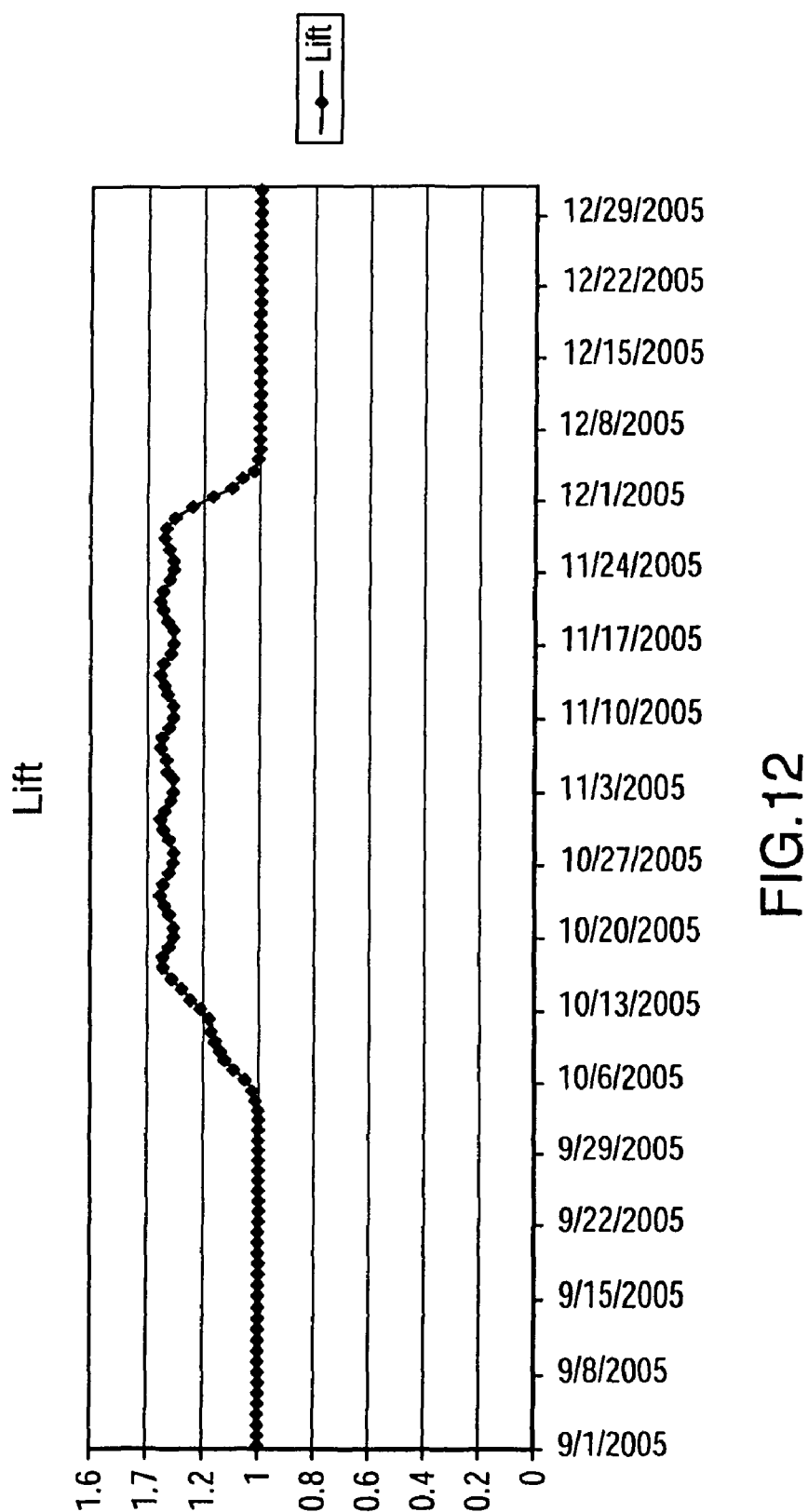

It is helpful for an analyst to see the full profile that will actually be applied against a specific Target Vehicle. More than one causative vehicle may target the same effect vehicle so that the final Lift Profile is the superposition of each individual causative profile. Thus, in the following example, a number of TV and Radio spots were run before and during a Postal Walk delivery vehicle. Each event was modeled to have a 7 day offset and a 2 day width with a 15% lift above normal base. The aggregated lift on a targeted postal walk vehicle is shown in FIG. 12 where the Lift Profile curve is superimposed upon the normal forecast curve for the vehicle.

At step 1026, a Geographical Saturation model is generated. To accomplish this, a client's geographical regions are first itemized (e.g. national, west, east, etc.) A ceiling parameter is defined for each region which allows for forecasted results to scale according to a region's saturation. This means that if the circulation (as defined in a marketing plan) in a region is tripled in one week, the leads generated will not triple according to each Vehicle's historical behaviour. Rather, the Leads generated in a region saturate to a predetermined ceiling value. The analyst therefore sets this ceiling value based upon a client's own business rules or after a careful mining of historical response data for each region.

In order to apply Geographical Saturation to a forecast, the full forecast must first be calculated and then aggregated into Geography/Week groupings for analysis. For each group, a saturation ratio is calculated as indicated below. Then, each individual forecast result within the group is adjusted by the engine 6 without losing information about its original value (for scenario planning and roll backs).

The saturation ratio is calculated as follows: $Y/X<=1$, where X=Sum of Forecast Leads for a specified region for a specified time duration and Y=The modified Forecast result based upon saturation. A Ceiling Parameter (A) is set for each specified region representing that region's "Effective Marketing Population", where an effective marketing population for a region is the maximum response expected if distributed media saturates the market reaching all potential customers. So, Saturation Ratio=$Y/X=(A/x)*Tanh(x/A)$, where Tanh is the hyperbolic tangent function. It should be noted that when x=A, the saturated response is approximately Y=3A/4.

Figure 13:
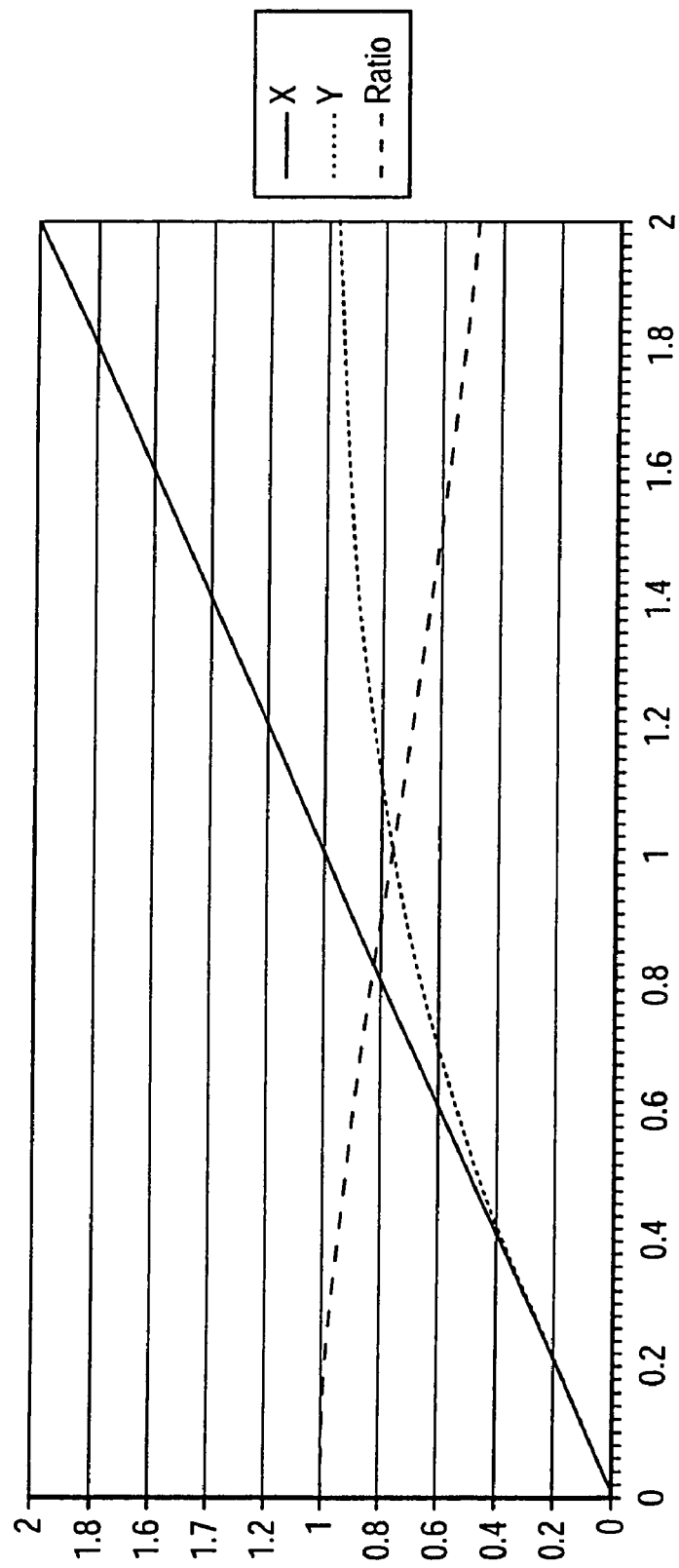
FIG. 13 shows a plurality of saturation curves, according to an additional aspect of the invention.

FIG. 13 shows a saturation curve for a ceiling parameter of 1, for the values indicated in Table A.

TABLE A

| X | Y | Ratio |
|---|---|---|
| 0 | 0 | 1 |
| 0.02 | 0.019997 | 0.999867 |
| 0.04 | 0.039979 | 0.999467 |
| 0.06 | 0.059928 | 0.998802 |
| 0.08 | 0.07983 | 0.997872 |
| 0.1 | 0.099668 | 0.99668 |
| 0.12 | 0.119427 | 0.995227 |
| 0.14 | 0.139092 | 0.993517 |
| 0.16 | 0.158649 | 0.991553 |
| 0.18 | 0.178081 | 0.989338 |
| 0.2 | 0.197375 | 0.986877 |
| 0.22 | 0.216518 | 0.984173 |
| 0.24 | 0.235496 | 0.981232 |
| 0.26 | 0.254296 | 0.97806 |
| 0.28 | 0.272905 | 0.974661 |
| 0.3 | 0.291313 | 0.971042 |
| 0.32 | 0.309507 | 0.967209 |
| 0.34 | 0.327477 | 0.963169 |
| 0.36 | 0.345214 | 0.958928 |
| 0.38 | 0.362707 | 0.954493 |
| 0.4 | 0.379949 | 0.949872 |
| 0.42 | 0.39693 | 0.945072 |
| 0.44 | 0.413644 | 0.940101 |
| 0.46 | 0.430084 | 0.934966 |
| 0.48 | 0.446244 | 0.929674 |
| 0.5 | 0.462117 | 0.924234 |
| 0.52 | 0.4777 | 0.918654 |
| 0.54 | 0.492988 | 0.912941 |
| 0.56 | 0.507977 | 0.907103 |
| 0.58 | 0.522665 | 0.901147 |
| 0.6 | 0.53705 | 0.895083 |
| 0.62 | 0.551128 | 0.888916 |
| 0.64 | 0.5649 | 0.882656 |
| 0.66 | 0.578363 | 0.876308 |
| 0.68 | 0.591519 | 0.869881 |
| 0.7 | 0.604368 | 0.863383 |
| 0.72 | 0.616909 | 0.856818 |
| 0.74 | 0.629145 | 0.850196 |
| 0.76 | 0.641077 | 0.843522 |
| 0.78 | 0.652707 | 0.836803 |
| 0.8 | 0.664037 | 0.830046 |
| 0.82 | 0.67507 | 0.823256 |
| 0.84 | 0.685809 | 0.816439 |
| 0.86 | 0.696258 | 0.809602 |
| 0.88 | 0.706419 | 0.802749 |
| 0.9 | 0.716298 | 0.795887 |
| 0.92 | 0.725897 | 0.789019 |
| 0.94 | 0.735222 | 0.782151 |
| 0.96 | 0.744277 | 0.775288 |
| 0.98 | 0.753066 | 0.768435 |
| 1 | 0.761594 | 0.761594 |
| 1.02 | 0.769867 | 0.754771 |

TABLE A-continued

| X | Y | Ratio |
|---|---|-------|
| 1.04 | 0.777888 | 0.747969 |
| 1.06 | 0.785664 | 0.741192 |
| 1.08 | 0.793199 | 0.734444 |
| 1.1 | 0.800499 | 0.727726 |
| 1.12 | 0.807569 | 0.721044 |
| 1.14 | 0.814414 | 0.714398 |
| 1.16 | 0.82104 | 0.707793 |
| 1.18 | 0.827452 | 0.70123 |
| 1.2 | 0.833655 | 0.694712 |
| 1.22 | 0.839654 | 0.688241 |
| 1.24 | 0.845456 | 0.681819 |
| 1.26 | 0.851064 | 0.675448 |
| 1.28 | 0.856485 | 0.669129 |
| 1.3 | 0.861723 | 0.662864 |
| 1.32 | 0.866784 | 0.656654 |
| 1.34 | 0.871672 | 0.650502 |
| 1.36 | 0.876393 | 0.644407 |
| 1.38 | 0.880951 | 0.63837 |
| 1.4 | 0.885352 | 0.632394 |
| 1.42 | 0.889599 | 0.626478 |
| 1.44 | 0.893698 | 0.620623 |
| 1.46 | 0.897653 | 0.614831 |
| 1.48 | 0.901468 | 0.6091 |
| 1.5 | 0.905148 | 0.603432 |
| 1.52 | 0.908698 | 0.597827 |
| 1.54 | 0.91212 | 0.592286 |
| 1.56 | 0.91542 | 0.586808 |
| 1.58 | 0.918602 | 0.581394 |
| 1.6 | 0.921669 | 0.576043 |
| 1.62 | 0.924624 | 0.570756 |
| 1.64 | 0.927473 | 0.565532 |
| 1.66 | 0.930217 | 0.560372 |
| 1.68 | 0.932862 | 0.555275 |
| 1.7 | 0.935409 | 0.550241 |
| 1.72 | 0.937863 | 0.545269 |
| 1.74 | 0.940227 | 0.54036 |
| 1.76 | 0.942503 | 0.535513 |
| 1.78 | 0.944695 | 0.530728 |
| 1.8 | 0.946806 | 0.526003 |
| 1.82 | 0.948838 | 0.52134 |
| 1.84 | 0.950795 | 0.516736 |
| 1.86 | 0.952679 | 0.512193 |
| 1.88 | 0.954492 | 0.507709 |
| 1.9 | 0.956237 | 0.503283 |
| 1.92 | 0.957917 | 0.498915 |
| 1.94 | 0.959534 | 0.494605 |
| 1.96 | 0.96109 | 0.490352 |
| 1.98 | 0.962587 | 0.486155 |
| 2 | 0.964028 | 0.482014 |

A person skilled in the art, having read this description of the preferred embodiment, may conceive of variations and alternative embodiments. For example, the system need not use client software peer se, or drive maps or even a local area network but may, instead, be entirely server based and provide centralized (instead of local) storage for users.

All such variations and alternative embodiments are believed to be within the ambit of the claims appended hereto.

What is claimed is:

1. A method of generating performance curves for enabling user customized marketing communications proficiency and performance optimization, comprising:
   collecting and storing historical vehicle data and response data relating to a marketing plan in a database;
   normalizing said data to a standardized schema using a predictive analytics and forecasting engine;
   performing non-linear polynomial regression analysis on the normalized data for generating a plurality of curves using said predictive analytics and forecasting engine;
   displaying said plurality of curves to said user using at least one server computer and one user computer in communication with said predictive analytics and forecasting engine; and
   creating a Vehicle Cast category for each distinct type of vehicle instance, creating a Default Classification category for each class of vehicle, and generating said plurality of curves for each said category resulting in Vehicle Cast curves and respective Default Classification curves representing performance of each said vehicle and Vehicle Cast category, wherein each of said plurality of curves is virtualized so as to be independent of any instances of said historical vehicle data and response data.

2. The method of claim 1, wherein a first one of said plurality of curves comprises a decay curve representing the response to an instance in said marketing plan of one of either a vehicle in said Vehicle Cast category or class in said Default Classification category, respectively, said decay curve being virtualized so as to be independent of date.

3. The method of claim 2, wherein a second one of said plurality of curves comprises a weekly curve superimposed on said decay curve, said weekly curve representing a set of normalized ratios indicating performance of said one of either a vehicle in said Vehicle Cast category or class in said Default Classification category, respectively, for each day of the week.

4. The method of claim 3, wherein a third one of said plurality of curves comprises an annual curve that modulates said decay curve and said weekly curve according to seasonal parameters indicating performance of said one of either a vehicle in said Vehicle Cast category or class in said Default Classification category, respectively, when used at different times of the year.

5. The method of claim 2, further comprising comparing said plurality of Vehicle Cast curves to respective Default Classification curves and in the event respective ones of said curves differ from associated ones of said default curves by more than a specified amount then replacing said respective ones of said curves by said associated ones of said default curves.

6. The method of claim 5, wherein at least one of said Default Classification curves comprises a Master Default curve based upon one of either historical data for all classifications of said vehicles or representing industry-specific data.

7. The method of claim 4, wherein said annual curve is a Trusted Annual Curve with a deviation from its associated Default Classification curve capable of being overridden.

8. The method of claim 4, further comprising generation and display of a forecast curve based on said decay, weekly and annual curves.

9. The method of claim 1, wherein said non-linear polynomial regression analysis uses Chebyshev polynomials as basis functions for polynomial fitting of said plurality of curves to said data.

10. A system for generating performance curves for a user customized marketing communications proficiency and performance optimization, comprising:
    a database for storing historical vehicle data and response data relating to a marketing plan;
    a predictive analytics and forecasting engine for retrieving and normalizing said data to a standardized schema, creating a Vehicle Cast category for each distinct type of vehicle instance, creating a Default Classification category for each class of vehicle and performing non-linear polynomial regression analysis on the normalized data for generating a plurality of curves for each said category resulting in Vehicle Cast curves and respective Default Classification curves, said curves representing performance of said marketing plan; and at least one server computer and one user computer in communication with said predictive analytics and forecasting engine for user managing of said plurality of curves and displaying said plurality of curves to said user, wherein each of said plurality of curves is virtualized so as to be independent of any instances of said historical vehicle data and response data.

11. The method of claim 10, wherein said at least one user computer includes client software that operates on production and in-memory client datasets to perform one or more functions selected from the group comprising: create and manage said marketing plan, model and perform forecasts based on said plurality of curves, create and forecast scenario plans, manage vehicles, advertisements, sources and modeling parameters, and provide integrated reports.

12. The system of claim 11, wherein said at least one user computer includes local data storage for saving one or more of scenarios, forecasts, and data presentation export files.

13. The system of claim 10, wherein said predictive analytics and forecasting engine and said at least one user computer communicate over a local area network and share two drive mapped file shares.

14. The system of claim 10, wherein said database further includes data warehousing processes for performing one or more of custom data imports, scheduled administrative functions and data mart processes.

15. The system of claim 10, further including a date generator for automating generation of dates conforming to a predetermined fiscal year for simplified display of said plurality of curves based on fiscal year, quarterly and weekly descriptors.

16. The system of claim 10, wherein said predictive analytics and forecasting engine uses Chebyshev polynomials as basis functions for polynomial fitting of said plurality of curves to said data.

* * * * *